READ-ONLY MAGNETIC MEMORY

Filed Oct. 23, 1962

INVENTORS
CHIA Y. HSUEH &
HENRY P. CICHON

BY Carl V. Olson
ATTORNEY 3,290,664
Patented Dec. 6, 1966

3,290,664

READ-ONLY MAGNETIC MEMORY

Chia Y. Hsueh, Levittown, Pa., and Henry P. Cichon, Medford Lakes, N.J., assignors to Radio Corporation of America, a corporation of Delaware Filed Oct. 23, 1962, Ser. No. 232,388
3 Claims. (Cl. 340—174)

This invention relates to so-called fixed or read-only memories.

There are applications in electronic data processing apparatus for both random access memories and fixed or read-only memories. A fixed or read-only memory is one wherein the storage of information is relatively fixed by the mechanical or physical construction of the memory, and wherein the stored information can be electrically or electronically read out as frequently as is desired without destroying the stored information. Punched cards are an example of a fixed or a read-only memory wherein each card is employed for the storage of one or more words. Punched cards are read one card at a time in time sequence. It is desirable to have a fixed or read-only memory capable of storing a large number of words, and having means for electronically addressing any selected one of the word locations for reading out the selected stored word.

It is a general object of this invention to provide an improved fixed or read-only memory wherein the storage of information is determined by the configuration of conductors linking apertures in a plurality of magnetic cores.

According to an example of the invention, there are provided a plurality of two-apertured magnetic cores, there being as many cores as there are information bits in each of the words to be stored in the memory. Each word location in the memory is constituted by a primary winding or word conductor which threads through one or the other of the two apertures in each of the plurality of magnetic cores. Each of the information bits of a stored word is determined by whether the primary winding or word conductor is threaded through one aperture of a core to store a "1," or is threaded through the other aperture of the core to store a "0." A multi-turn secondary winding is wound around the central magnetic leg between the two apertures of each magnetic core. A desired stored word in the memory is read out therefrom by selectively energizing the corresponding primary winding, and applying the induced signals on the secondary windings to respective sense amplifiers to provide outputs for each of the bits of the selected word.

These and other objects and advantages of the invention will be apparent to those skilled in the art from the following more detailed description taken in conjunction with the appended drawing, wherein.

Figures 1, 2, 3:
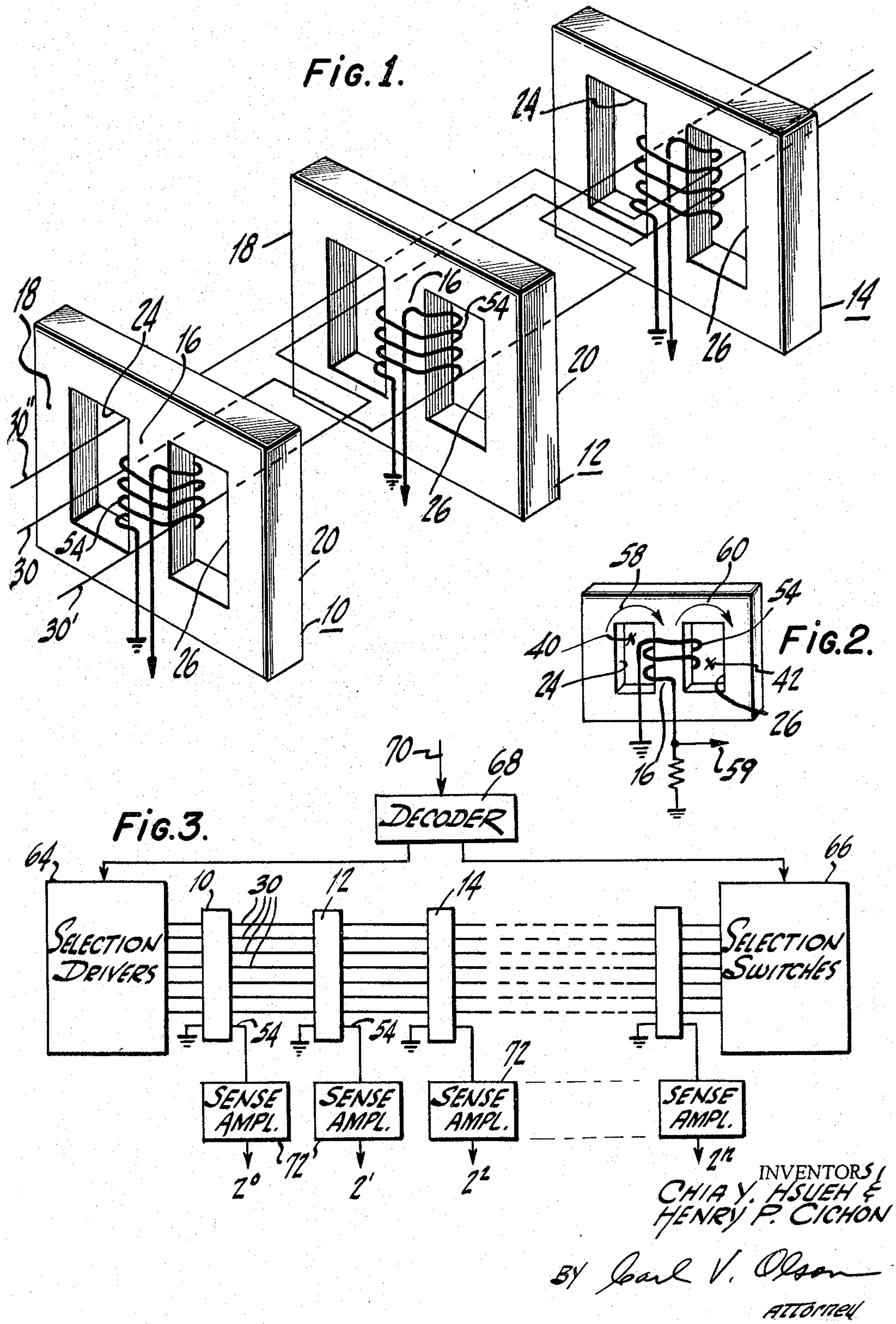
FIGURE 1 is a perspective view of a fixed memory constructed according to the teachings of the invention and including two illustrative primary conductors arranged with three cores for the storage of two words each having three bits of information.
FIGURE 2 is a representation of a single core which will be referred to in describing the operation of the memory of FIGURE 1.
FIGURE 3 is a block diagram of a fixed memory including the construction of FIGURE 1 and including associated electronic circuits.

Reference will now be made in greater detail to FIGURE 1 of the drawing which illustrates three two-aperture magnetic cores 10, 12 and 14 each having a central leg 16 and two end legs 18 and 20 defining two apertures 24 and 26. The cores are preferably constructed of a ferrite magnetic material such as is commonly employed for pulse transformers. The core material need not be one having a square loop hysteresis characteristic since the cores are used in the manner of a transformer core, rather than in the manner of a memory core having high retentivity in two magnetic states. The cores may have a linear magnetization characteristic.

One word of information stored in the memory is determined by the configuration of a primary winding conductor 30 which provides a conductive path extending through the aperture 24 of core 10 for the storage of a "1," extends through aperture 26 of core 12 for the storage of a "0," and extends through aperture 24 of core 14 for the storage of a "1." Other words of information stored in the memory are determined by the configuration of primary winding conductors 30′ and 30″. Each of these, also, extends through an aperture 24 for storage of a "1" and through aperture 26 for storage of a "0," at each core. While FIGURE 1 shows only three primary winding conductors for the storage of three words each having three bits, it will be understood that a memory according to the invention will normally have a large number (such as sixty-four) of primary winding conductors 20 for the purpose of storing a corresponding number of words.

The central leg 16 of each of the cores 10, 12 and 14 has wound therearound an individual multi-turn secondary winding 54. When one word of the memory is interrogated, each secondary winding 54 provides a signal indicative of one information bit of the word.

FIGURE 2 will now be referred to in describing the operation of each of the magnetic cores in the arrangement of FIGURE 1. A primary winding conductor 40 carrying a current pulse going into the paper through aperture 24 causes a magnetic flux around the aperture 24 in the direction represented by the arrow 58. This, by transformer action, induces a signal in the secondary winding 54 which appears at the output terminal 59 as a signal pulse of one polarity which may represent a stored "1." An output signal of the opposite polarity representing a stored "0" is provided when the primary winding conductor 42 of another word is energized by a current pulse going into the paper through aperture 26 to produce flux in the direction represented by the arrow 60. The one of the apertures 24 and 26 through which a primary winding passes determines the direction of the flux in the central leg 16 and determines the polarity of an output signal induced on the secondary winding 54.

The signals, described above, are induced in the secondary winding 54 during the leading edge of the interrogation pulse applied to a primary winding conductor 40. The trailing edge of each interrogation pulse causes the induction of an opposite-polarity signal in the secondary winding. Solely the signals due to the leading edge of the interrogation pulse (or the trailing edge) are sensed by strobing the sense amplifier (FIGURE 3) in the customary manner.

FIGURE 3 illustrates a memory system including a plurality of cores including those labeled 10, 12 and 14, all the cores being linked by conductors 30 each of which defines one of a plurality of words stored in the memory. The terminals of each primary winding conductor 30 are connected to selection drivers 64 and selection switches 66, respectively. The drivers 64 and switches 66 are operated under the control of a decoder 68 in response to signals on input lead 70 which identifies the particular word desired to be read out from the read-only memory. The drivers 64, switches 66 and decoder 68 are conventional known circuits for the selection of one of a number of conductors or word lines in a memory. The secondary coil 54 wound on each of the cores is coupled to a respective sense amplifier 72. The several sense amplifiers each provide one digit of the interrogated word on the output leads labeled $2^0$, $2^1$, $2^2$ and $2^n$.

Thus, the operation of the read-only memory is such that every time an interrogation pulse is applied to a selected one of the primary winding conductors 30, the information bits available at the outputs of the sense amplifiers 72 represent the information bits of the selected word stored in the memory by the configuration of the respective primary winding.

What is claimed is:

1. A memory construction for the storage of *m* words each having *n* bits, where *m* and *n* are each greater than one, comprising,

*n* magnetic cores each having two apertures with a central magnetic leg therebetween,

*m* primary windings each extending through one aperture of each of said magnetic cores, a primary winding extending through one aperture of a core to store a "0," and a primary winding extending through the other aperture of a core to store a "1," and a secondary winding wound around the central leg of each of said magnetic cores.

2. A memory construction of the storage of *m* words each having *n* bits, where *m* and *n* are each greater than one, comprising,

*n* magnetic cores each having two apertures with a central magnetic leg therebetween,

*m* primary windings each extending through one aperture of each of said magnetic cores, a primary winding extending through one aperture of a core to store a "0," and a primary winding extending through the other aperture of a core to store a "1,"

a multi-turn secondary winding wound around the central leg of each of said magnetic cores, means to apply an interrogation pulse through any selected one of said primary windings, and means to sense the signal induced in each of said secondary windings as a "0" or a "1" depending on which aperture of the particular core the interrogated primary winding passes.

3. A memory construction for the storage of *m* words each having *n* bits, where *m* and *n* are each greater than one, comprising,

*n* magnetic cores each having two apertures with a central magnetic leg therebetween,

*m* primary windings, each primary winding being linked in sequence with all of said cores, each primary winding through one or the other of the two apertures of each core, a primary winding extending through one aperture of a core to store a "0" and extending through the other aperture of a core to store a "1,"

*n* multi-turn secondary windings each wound around the central leg of a respective one of said *n* magnetic cores, means to apply an interrogation pulse through any selected one of said *m* primary windings, and

*n* sense means to sense the *n* signals induced on respective ones of the *n* secondary windings, each of the sense signals having a "0" polarity or a "1" polarity depending on whether the interrogation primary winding extends through one or the other of the two apertures of the respective magnetic core.

References Cited by the Examiner

UNITED STATES PATENTS

| | | | |
|---|---|---|---|
| 2,968,795 | 1/1961 | Briggs et al. | 340—174 |
| 3,078,447 | 2/1963 | Ketchledge | 340—174 |

OTHER REFERENCES

Publication I: "Multihole Ferrite Core Configurations and Applications," by Abbott et al., Proceedings of the IRE, volume 45, No. 8, pages 1081–1083.

References Cited by the Applicant

FOREIGN PATENTS

| | | |
|---|---|---|
| 1,294,285 | 4/1962 | France. |

BERNARD KONICK, *Primary Examiner.*

IRVING SRAGOW, *Examiner.*

S. M. URYNOWICZ, *Assistant Examiner.*